Patented Nov. 14, 1944

2,362,614

UNITED STATES PATENT OFFICE 2,362,614

INSECTICIDES

Jose B. Calva, St. Paul, Minn.

No Drawing. Application March 11, 1940,
Serial No. 323,339

4 Claims. (Cl. 167—22)

My invention relates to an improvement in insecticides wherein it is desired to provide an insecticide or larvacide providing protection to any article or product commonly infested such as agricultural products, wearing apparel and the like.

In my application, Serial No. 20,393, filed May 8, 1935, for "Moth proofer," of which the present application is a continuation in part, I described certain substances useful for mothproofing purposes such as the fluorides of alkyls and hydroxy-alkyl substituted ammonias. I have found that in various other ammonia compounds in which the fluorine is directly linked to nitrogen in the molecule, the resultant insecticide is extremely efficient and is advantageous for use. The present invention is designed to continue the protection granted by my formerly filed application, and to cite specific examples of certain of the substances named in the various broad classes defined in my former application.

In my experiments I have found that where the fluorine is directly linked to nitrogen in the molecule, the fluorine is readily available for its insecticidal effect, and is therefore more desirable than other forms of compounds in which the fluorine forms part of a complex ion or radical such as in the case of the fluosilicates. I am aware that various compounds have previously been formed and used as insecticides, such as inorganic fluorides and various fluosilicates. The present invention, however, is limited to organic compounds in which the nitrogen is directly linked to the fluorine in the molecule.

Among the various compounds which I have found effective for mothproofing and insecticidal purposes are included the primary, secondary, and tertiary amines and polyamines of pure hydrocarbons or hydrocarbons having substituent atoms, groups, or radicals in their structure. I have already described and claimed the fluorides of the alkylamines and the hydroxyalkylamines in my previously filed application above identified. As an example of such a substance, I cited a mixture of mono-, di-, and tri-ethanolammonium fluoride.

As examples of substances embraced by the present application, I list the following general classes, it being clearly understood that it would be impractical to list every compound which would lie in these general classes. As insecticides, I desire the hydrofluoric acid addition compounds of the alkylamines with or without substituent groups, atoms, or radicals in their structure. I further desire as insecticides the hydrofluoric acid addition compounds of the ammonia substituted compounds giving rise to primary, secondary, or tertiary amines and polyamines of the following residues: alkenes, alkines, homocyclic residues (mono and polycyclic), and polynuclear aromatic aliphatic compounds, with amino groups either in the aromatic or aliphatic ring, aromatic residues, heterocyclic residues in which oxygen forms a part of the nucleus, heterocyclic residues in which nitrogen forms a part of the nucleus, heterocyclic compounds containing more than one nitrogen in their nuclei, and the alkaloids.

The present invention thus embodies the hydrofluorides of organic bases in which the fluorine is directly linked to nitrogen or in other words, ammonium fluoride substituted compounds in which one or more of the hydrogens attached to the nuclear nitrogen are substituted by the above mentioned residues. The products may also be defined as hydrofluoric acid addition compounds of the amines and polyamines of the residues mentioned above.

In order that the various compounds which are capable of acting as insecticides may be clearly understood, I am providing the following groups of examples of specific compounds giving the formula, the name, the volume and page on which these compounds are listed in Beilstein's Handbuch de Organischen Chemie. I desire to use the hydrofluorides of the following compounds or any of their derivatives. These examples are only representative of the type of compounds which I desire to protect, and comprise by no means a complete description of all of the compounds I intend to use.

As an example of alkylamines having substituent groups, atoms, or radicals in their structure, the substituents being other than hydroxyl, I list the following:

| Formula | Name | Volume | Page |
|---|---|---|---|
| H₂   Cl   H₂<br>C—C—C<br>\|   H   \|<br>NH₂       NH₂ | 2 chloro-1,3-diamino propane. | IV | 263 |
| CH₃—CH₂NHCH₃<br>\|<br>Br | 2 bromo-1-methyl-amino ethane. | IV | 134 |
| CH₃<br>\|<br>CH₃CH₂CHBrCH·NH₂ | 3 bromo-2 amino pentane. | IV | 178 |
| H₂   NO₂   H₂<br>C——C——C<br>\|   \|   \|<br>N(CH₃)₂H   N(CH₃)₂ | 2 nitro-1,3-bis(dimethyl-amino) propane. | IV | 263 |

As examples of alkenamines, I propose the following: I also desire to protect their isomers, the amino, imino, or substituted amino groups capable of forming addition compounds with hydrofluoric acid.

| Formula | Name | Volume | Page |
|---|---|---|---|
| CH₂=CHCH₂NH₂ | Allylamine | IV | 205 |
| CH₂=CHCH₂CH₂NH₂ | Allylo-methylamine | IV | 220 |
| CH₃CH=CHCH₂NH₂ | Crotylamine | IV | 221 |
| CH₂=CHCH₂CH(CH₂CHCH₂)₂·CH₂NH₂ | 4 amino-4 methyl heptadiene (1, 6) | IV | 229 |

As examples of alkines capable of forming a fluorine to nitrogen linkage, I propose the following:

| Formula | Name | Volume | Page |
|---|---|---|---|
| CH≡CHNH₂ | Acetyleneamine | IV | 228 |
| CH≡CHCH₂NH₂ | Propargylamine | IV | 228 |

As examples of diamines and polyamines, I list the following:

| Formula | Name | Volume | Page |
|---|---|---|---|
| H₂NCH₂NH₂ | Methylene diamine. | IV | 230 |
| H₂NCH₂·CH₂NH₂ | Ethylene diamine. | IV | 230 |
| CH₃CH(NH₂)CH₂NH₂ | Propylene diamine. | IV | 257 |
| H₂NCH≡CHNH₂ | Vinylene diamine. | IV | 273 |
| NH₂CH₂NH₂CH·NH₂CH₂ | Alpha, beta, tri-amino propane. | IV | 274 |

As an example of complex substituted amines or tertiary amines I propose the following:

CH₂=C(CH₃)CH₂CH(OH)CH₂CH(CH₃)N(CH₃)₂

6-dimethylamines-2-6 dimethyl heptene 1-ol (4) Volume IV, page 301.

As an example of mono and polycyclic compounds, I propose the following:

| Formula | Name | Volume | Page |
|---|---|---|---|
| CH₂<br>\\<br>  CHNH₂<br>/<br>CH₂ | Cyclopropylamine | XII | 3 |
| CH₂—CH₂<br>\|       \|<br>CH₂—CHNH₂ | Cyclobutylamine | XII | 4 |

As an example of unsaturated cyclic compounds, I propose the following:

| Formula | Name | Volume | Page |
|---|---|---|---|
| H₂NHC—CH<br>\|       \\<br>\|        CH<br>CH₂——CH₂ | 3 or 4 amino cyclopentene (1) | XII | 32 |
| NH₂<br>H   \|<br>HC=C—C<br>\|         \\<br>\|          CH<br>C—C—CH₂<br>H₂ H₂ | 2 amino cyclo heptadiene | XII | 52 |

As an example of polycyclic (dicyclic) compounds, I propose the following:

| Formula | Name | Volume | Page |
|---|---|---|---|
| H<br>H₂C—C—CHCH₃<br>\|   CH₂ CH₂<br>H₂C—C—C—NH₂<br>H H | 4-amino-2 methyl bicyclic 1,2,3 octane. | XII | 37 |

As examples of aromatic amines, I propose the following:

| Formula | Name | Volume | Page |
|---|---|---|---|
| ⌬—NH₂ | Aniline | XII | 59 |
| ⌬—CH(CH₃)—CH₃ ... NH₂ | Ortho-, meta-, and para-isopropyl aniline. | XII | 1147 |

As examples of unsaturated side chain aromatic amines, I propose the following:

| Formula | Name | Volume | Page |
|---|---|---|---|
| NH₂—⌬—CH=CH₂ | 2 vinyl aniline | XII | 1187 |
| NH₂—⌬—CH=CH—⌬ | 2 amino stilbene | XII | 1132 |
| NH₂—⌬—C≡CH | 2 acetylene aniline. | XII | 1210 |

As examples of aromatic amines and their derivatives formed by the substitution of some of the hydrogens in the residues by other negative atoms or groups of atoms, I propose the following:

| Formula | Name | Volume | Page |
|---|---|---|---|
| [structure] | Ortho-chlor-aniline | XII | 597 |
| [structure] | N-methyl-6 chloro aniline | XII | 603 |

As examples of polynuclear compounds, I propose the following:

| Formula | Name | Volume | Page |
|---|---|---|---|
| [structure] | Alpha-naphthylamine | XII | 1312 |
| [structure] | 4-amino diphenyl | XII | 1724 |
| [structure] | Amino anthracene | XII | 1335 |
| [structure] | Amino phenanthracene | XII | 1236 |

As examples of aromatic-aliphatic compounds with amino groups either in the aromatic nucleus or the aliphatic ring, I propose the following:

| Formula | Name | Volume | Page |
|---|---|---|---|
| [structure] | Hydrindamine | XII | 1191 |
| [structure] | 2 amino fluorene | XII | 1331 |
| [structure] | 5 amino acenaphthene | XII | 1322 |

As an example of aromatic cyclo-alkynes, I propose the following:

| Formula | Name | Volume | Page |
|---|---|---|---|
| [structure] | 5 amino 2 methyl indene | XII | 1210 |

As examples of aromatic amino compounds and their derivatives, I propose the following:

| Formula | Name | Volume | Page |
|---|---|---|---|
| [structure] | Phenyl hydroxylamine | XV | 2 |
| [structure] | 4 hydroxylamine ethoxybenzene | XV | 35 |
| [structure] | Phenylhydrazine | XV | 67 |
| [structure] | 2 phenyl-1-benzol-3-formyl-triazan | XVI | 685 |
| [structure] | Phenyltriazan | XVI | 685 |
| [structure] | Benzoldiazo-(alpha-ethyl) hydrozid | XVI | 746 |

As examples of heterocyclic compounds in which only oxygen forms part of the nucleus, I propose the following:

| Formula | Name | Volume | Page |
|---|---|---|---|
| H₂C—CH—CH₂—NH₂ (with O bridge) | Gamma aminopropylen-oxydophydrinamine | XVIII | 593 |
| HC—CH / HC—C—NH₂ (O bridge) | Alpha-furylamine | XVIII | 594 |
| C₆H₄—CH / C—NH₂ (O bridge) | 2 amino cumaron | XVIII | 595 |
| dibenzofuran-NH₂ | 2 amino diphenylenoxide | XVIII | 597 |
| NH₂—dibenzofuran—NH₂ | 2,7 diaminodiphenylenoxide | XVIII | 591 |
| furyl-CH(C₆H₄-NH₂)₂ | 2(4,4′ diamino-benzhydryl) furane | XVIII | 593 |
| dibenzofuran-NH—NH₂ | 2 hydrazino diphenylenoxyde | XVIII | 610 |
| H₂C—CH—NH₂ / H₂C—C=O (O bridge) | Alpha-amino butyrolactone | XVIII | 601 |
| amino coumarin structure | 5 amino cumarine | XVIII | 603 |
| H₂N-benzene-O-CH₂-O (methylenedioxy) | 4 amino,-1,2 methylendioxy benzol | XIX | 323 |

As examples of heterocyclic compounds in which nitrogen forms part of the nucleus, I propose the following:

SATURATED 1 CYCLIC COMPOUNDS

| Formula | Name | Volume | Page |
|---|---|---|---|
| H₂C—CH₂ / H₂C—CH₂ \ NH | Pyrrolidine | XX | 4 |
| H₂C(CH₂)₄NH ring | Piperidine | XX | 6 |

SATURATED 2 CYCLIC COMPOUNDS

| Formula | Name | Volume | Page |
|---|---|---|---|
| bicyclic imine | 1,4 imino cyclo-heptane | XX | 140 |

UNSATURATED MONOCYCLIC COMPOUNDS

| Formula | Name | Volume | Page |
|---|---|---|---|
| HC=CH / H₂C—CH₂ \ NH | Pyrrolene | XX | 133 |
| HC=CH / HC=CH \ NH | Pyrrole | XX | 159 |
| C₅H₅N ring | Pyridine | XX | 181 |
| pyridine-C=C-H₂ | Alpha-vinyl pyridine | XX | 256 |

| Formula | Name | Volume | Page |
|---|---|---|---|
| (Isotropidine structure) | Isotropidine | XX | 176 |
| (1,2,3,4 tetrahydroquinoline structure) | 1,2,3,4 tetra hydro quinoline | XX | 262 |
| (Quinoline structure) | Quinoline | XX | 339 |
| (Isoquinoline structure) | Isoquinoline | XX | 380 |
| (Indole structure) | Indole | XX | 304 |
| (Dibenzopyrrole structure) | Dibenzopyrrole | XX | 433 |

DERIVATIVES OF THE ABOVE

| Formula | Name | Volume | Page |
|---|---|---|---|
| (Alpha-carboxy-pyrrolidine structure) | Alpha-carboxy-pyrrolidine | XXII | 1 |
| (1,2,3,4 tetrahydroquinoline 5-sulfonic acid structure) | 1,2,3,4 tetra hydro quinoline, 5 sulfonic acid | XXII | 387 |
| (8-aminoquinoline structure) | 8 aminoquinoline | XXII | 450 |
| (Tryptophane structure) | Tryptophane | XXII | 545 |
| ((Quinolyl (2)) diimide structure) | (Quinolyl (2)) diimide | XXII | 576 |
| (3,3' diazoaminopyridine structure) | 3,3′diazoamino pyridine | XXII | 593 |

As examples of heterocyclic compounds containing more than one nitrogen in the nucleus, I propose the following:

| Formula | Name | Volume | Page |
|---|---|---|---|
| (Phenylpyrazolidine structure) | Phenylpyrazolidine | XXIII | 2 |
| (Diethylenediamine structure) | Diethylenediamine | XXIII | 4 |
| (Imidazol structure) | Imidazol | XXIII | 45 |
| (Pyridazin structure) | Pyridazin | XXIII | 89 |
| (Pyrimidine structure) | Pyrimidine | XXIII | 89 |
| (Pyrazine structure) | Pyrazine | XXIII | 91 |
| (1,2,3,4 tetrahydroquinolinoxaline structure) | 1,2,3,4 tetra hydro quinolinoxaline | XXIII | 106 |
| (Indazole structure) | Indazole | XXIII | 122 |

| Formula | Name | Volume | Page |
|---|---|---|---|
| | 1,2 dihydro phthalazine | XXIII | 136 |
| | 3,4 benzopyridazine or cinnoline | XXIII | 173 |
| | 4-5 benzo-pyridazine or phthalazine | XXIII | 174 |
| | Benzo pyrimidine or quinoxaline | XXIII | 175 |
| | Benzo pyrazin | XXIII | 176 |
| | Pyridino pyridine or naphthyridin | XXIII | 177 |
| | 2 methyl phenazine | XXIII | 237 |
| | 2 methyl-1,5 phenanthroline | XXIII | 238 |
| | Diindole | XXIII | 253 |

As examples of alkaloids I propose the following:

| Formula | Name | Volume | Page |
|---|---|---|---|
| | Nicotine | XXIII | 110 |
| | Quinine | XXIII | 511 |
| | Caffeine | XXVI | 461 |

It will be noted that all of the foregoing compounds have in common the fact that when combined with hydrofluoric acid they form a fluoride in which the fluorine is directly linked with nitrogen in the molecule. I have found that organic amines and the like when combined with hydrofluoric acid will form compounds in which the fluorine is directly linked to nitrogen and have found that these substances in general act as insecticides.

In accordance with the patent statutes, I have described the insecticide I have discovered and the materials forming the same; and while I have endeavored to set forth the best embodiments thereof, I desire to have it understood that these are only illustrative of compounds which carry out my invention, and that obvious changes may be made within the scope of the following claims without departing from the spirit of my invention.

I claim:

1. An insecticide containing as an essential ingredient a fluoride of the amines and polyamines of alkyls having substituent atoms in their structure in which the fluorine atom is directly linked to an amino nitrogen atom.

2. A moth-proofing substance including the fluorides of alkyl substituted ammonia in which the fluorine is directly linked with a nitrogen atom.

3. A moth-proofing substance including the fluorides of hydroxyalkyl substituted ammonias.

4. A moth-proofing substance comprising a mixture of mono-, di-, and tri-ethanolammonium fluoride.

JOSE B. CALVA.